United States Patent [19]
Ramseth

[11] Patent Number: 5,374,095
[45] Date of Patent: Dec. 20, 1994

[54] WHEELBARROW BIN WALL EXTENSION APPARATUS

[76] Inventor: Irene P. Ramseth, 2001 Maple Glen Rd., Sacramento, Calif. 95864

[21] Appl. No.: 166,534

[22] Filed: Dec. 13, 1993

[51] Int. Cl.⁵ .............................................. B62B 5/00
[52] U.S. Cl. ..................................... 296/32; 280/47.18
[58] Field of Search ........................ 296/32, 36, 100; 280/47.18, 47.31, 653; 298/3

[56] References Cited
U.S. PATENT DOCUMENTS

| | | |
|---|---|---|
| 990,197 | 4/1911 | Haeske . |
| 1,769,271 | 7/1930 | Parsons . |
| 2,480,534 | 8/1949 | Wohland . |
| 2,676,054 | 4/1954 | Pasin . |
| 2,768,022 | 10/1956 | Pope ............................ 280/47.18 X |
| 2,805,885 | 9/1957 | Elzea . |
| 3,161,434 | 12/1964 | Jerpbak . |
| 3,870,367 | 3/1975 | O'Brien . |
| 4,049,284 | 9/1977 | Capper ............................ 280/47.18 |
| 4,095,838 | 6/1978 | Beeler .............................. 296/32 X |
| 4,645,225 | 2/1987 | Eubanks . |

FOREIGN PATENT DOCUMENTS

| | | | |
|---|---|---|---|
| 2574360 | 6/1986 | France ............................... 280/47.31 |
| 4204695 | 8/1992 | Germany ........................... 280/47.31 |
| 810467 | 3/1959 | United Kingdom ............. 280/47.31 |
| 837228 | 6/1960 | United Kingdom ............. 280/47.31 |
| 9106460 | 5/1991 | WIPO .............................. 280/47.31 |

Primary Examiner—Dean J. Kramer
Attorney, Agent, or Firm—John P. O'Banion; John Costello

[57] ABSTRACT

A wheelbarrow side wall extension apparatus (10) for attachment to a wheelbarrow (12) is disclosed herein. The apparatus (10) includes a flexible barrier (14) coupled between an upper rail (26) and a lower rail (28), the lower rail (28) being configured for coupling to the rim (36) of a wheelbarrow bin (12). A plurality of vertical support members (42) coupled between the upper rail (26) and the lower rail (28) rail add structural integrity to the apparatus (10). Each support member (42) is coupled to a corresponding reinforcement bracket (48) which provides lateral stability by abutting the walls (54) of a wheelbarrow bin (12). A tensioning device (56) draws the opposing sides (20, 22) of the flexible barrier (14) toward the inside of the wheelbarrow bin (12), thus insuring that the entire apparatus (10) remains firmly upon the wheelbarrow bin (12).

15 Claims, 5 Drawing Sheets

FIG. — 1

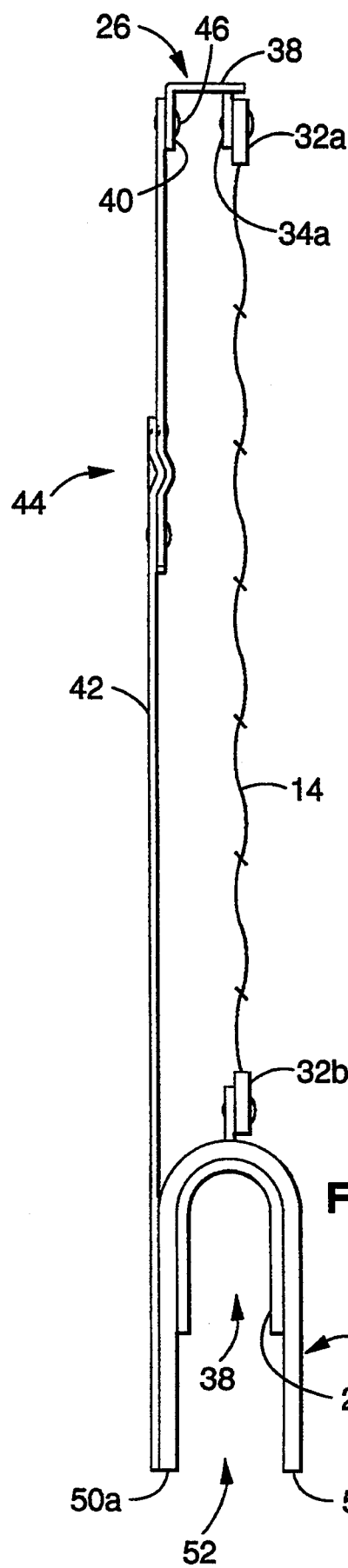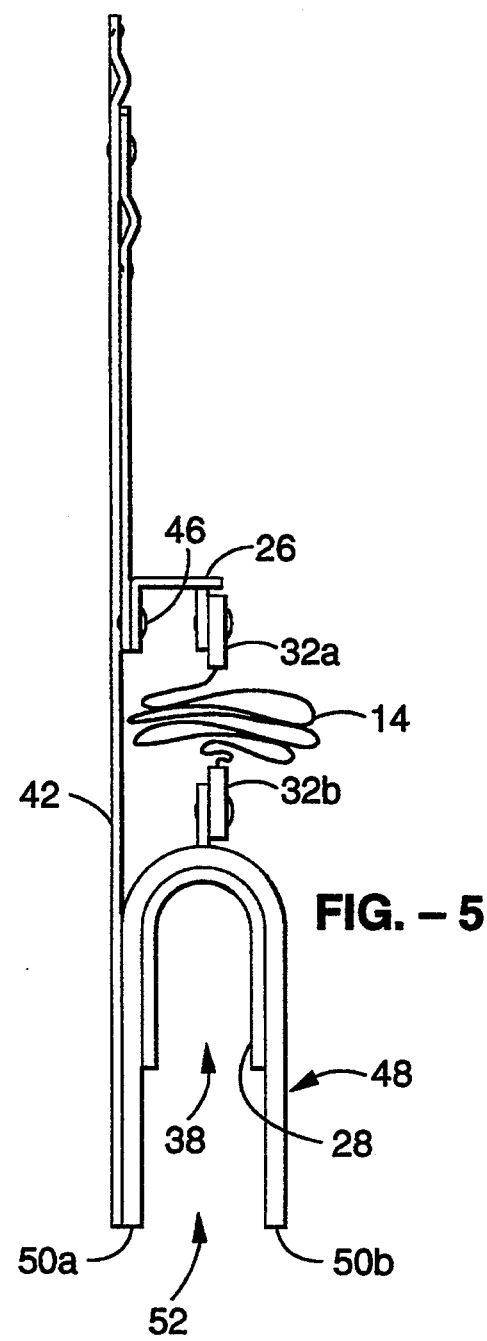

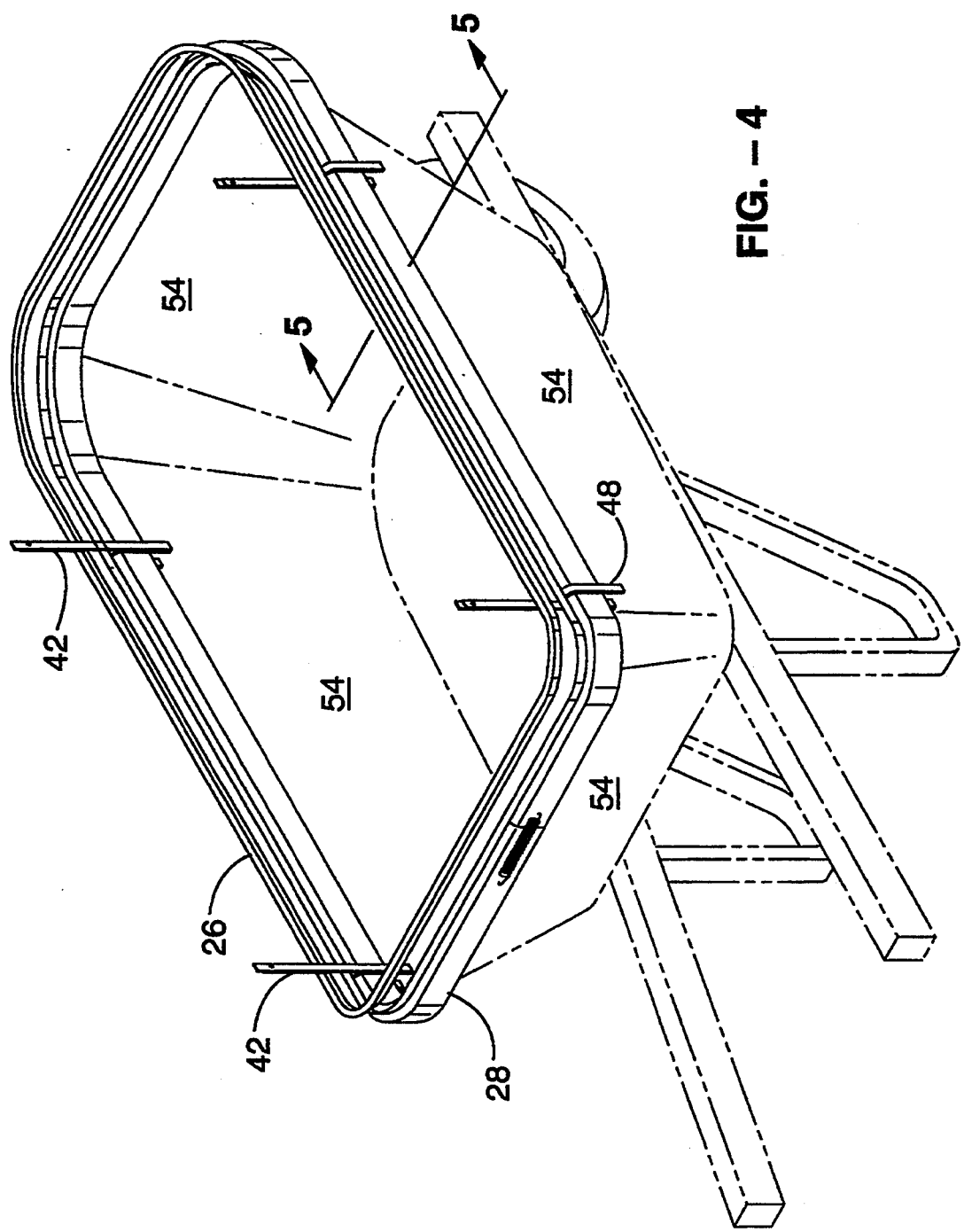
FIG. — 4

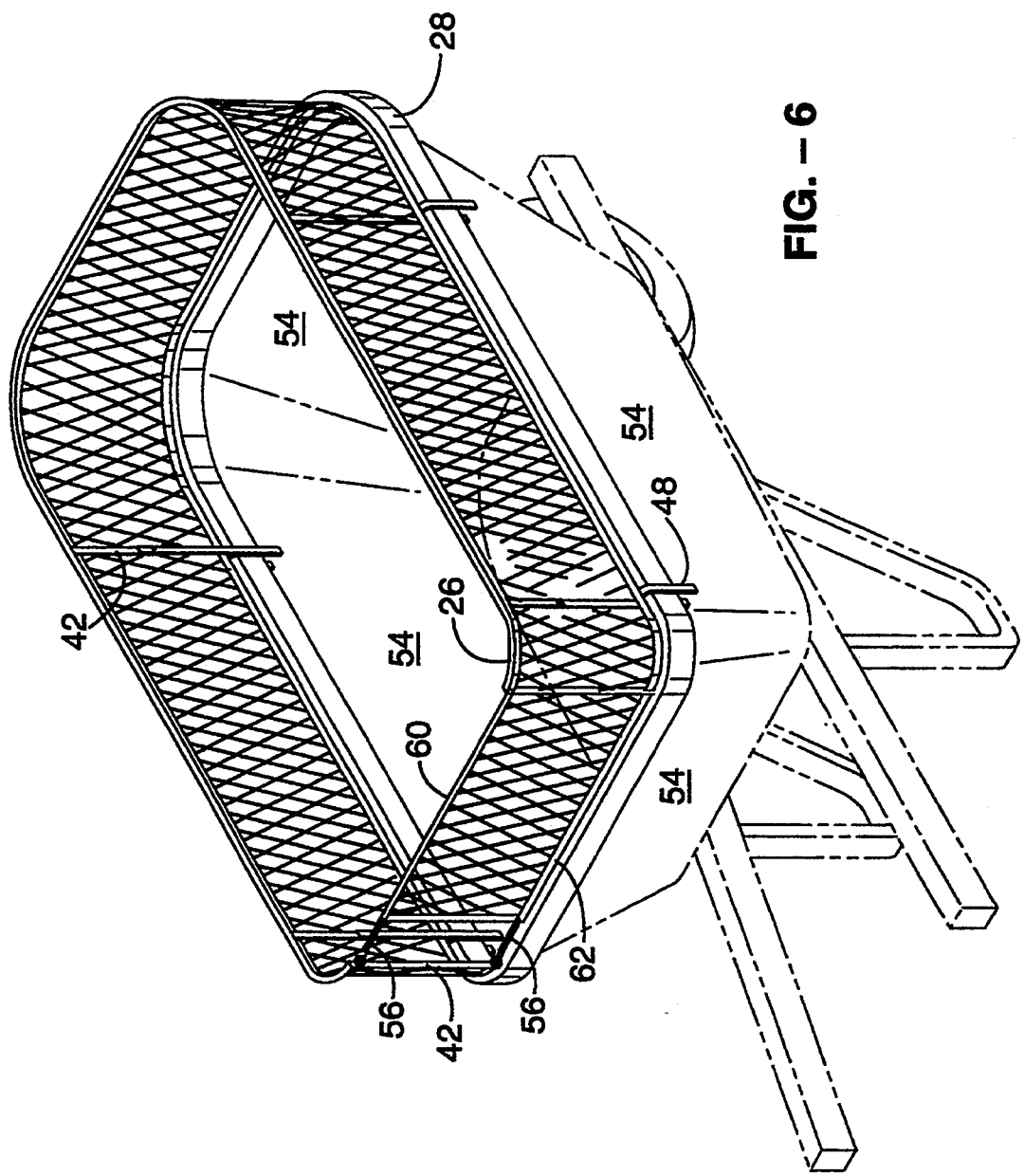

WHEELBARROW BIN WALL EXTENSION APPARATUS

BACKGROUND OF THE INVENTION

1. Field of the Invention

This invention pertains generally to moveable carriers for articles, and more particularly to an apparatus for extending the sides walls of a wheelbarrow bin to increase its load carrying capability.

2. Description of the Background Art

A wheelbarrow is a commonly used tool for carrying heavy loads or for moving light, bulky loads such as leaves. When transporting light, bulky loads in a wheelbarrow, however, the user often overloads the wheelbarrow bin, such that upon moving the loaded wheelbarrow to a desired location a portion of the load spills over the sides of the wheelbarrow bin. This spillage necessitates a second effort to remove the material from the ground, thus increasing the work necessary to move a load of material. To avoid this problem, numerous devices have been devised to keep a large load contained within the confines of a wheelbarrow bin.

For example, U.S. Pat. No. 2,805,885, issued to Elzea and U.S. Pat. No. 3,161,434, issued to Jerpbak, disclose rigid side extension structures which can be attached to the sides of a wheelbarrow bin, thus increasing the load capacity of a wheelbarrow. U.S. Pat. No. 1,769,271, issued to Parsons, discloses a mesh box attachment for a wheelbarrow bin.

Of the prior devices adapted for use with wheelbarrows, attachment to a wheelbarrow bin is achieved by a variety of means, including clamps, screws and the like. Generally, to release the clamps or remove the screws, an increased expenditure of time is required, which presents a disadvantage with these prior devices. Additionally, the rigid structural nature of the prior devices prevents them from being broken down and easily stored in a tool shed or other confined location.

An alternative to the rigid wheelbarrow attachments previously described is seen in U.S. Pat. No. 3,870,367, issued to O'Brien, which discloses a superstructure coupled to a wheelbarrow bin comprised of a large net suspended between a plurality of corner poles. To empty this device, a pair of ropes attached to the net must be pulled, which turns the net inside-out. While this device is easily removed from a wheelbarrow bin and stored, two significant drawbacks persist, namely: (1) upon turning the large net inside-out the user is often blanketed with dust and debris, and (2) upon emptying heavy loads, the weight of the load could cause the ropes to place substantial force upon the net during the emptying procedure, thus causing potential tears in the net.

Therefore, a need still exists for a device which allows the walls of a wheelbarrow bin to be extended, which can be easily removed to allow for the trouble-free emptying of a wheelbarrow bin, and which can additionally be collapsed and stored in a confined location. The present invention satisfies those needs as well as overcomes the deficiencies of the prior devices.

The foregoing patents reflect the state of the art of which the applicant is aware and are tendered with the view toward discharging the applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

The present invention generally pertains to an apparatus for extending the walls of a wheelbarrow bin and enlarging the load carrying capability of the wheelbarrow. By way of example, and not of limitation, the present invention includes a flexible barrier coupled between an upper rail and a substantially parallel lower rail. A plurality of support members arranged in a perpendicular orientation between the rails provide added structural integrity. The rails, support members and flexible barrier, together, form an extension apparatus having substantial flexibility, and which surrounds and extends above a traditional wheelbarrow bin.

The apparatus is attached to the wheelbarrow bin by way of the lower rail which conforms substantially to the shape of the rim of a wheelbarrow bin. For example, if the rim of the wheelbarrow bin is U-shaped, the lower rail would likewise be of a U-shaped configuration so as to form-fit to the rim of the wheelbarrow bin. By form-fitting to the rim of a wheelbarrow bin, the lower rail is capable of holding the entire apparatus in place. The lower rail includes a channel for receiving the rim of the wheelbarrow and, therefore, the lower rail fits over and engages the wheelbarrow rim.

Additionally, a plurality of arcuate brackets having downwardly extending arms can be attached to the lower rail. The arcuate brackets may be formed integrally with the lower rail or coupled to the lower rail using conventional fasteners. The arms of the arcuate brackets extend in a parallel relation to each other below the lower rail, a short distance, to create a gap for further receiving the rim of a wheelbarrow bin. This configuration of the lower rail in conjunction with the arcuate brackets allows the apparatus to be held atop a wheelbarrow bin without clamps, screws, or the like, and further provides for stability in response to lateral movement. In normal use, the entire apparatus can be easily lifted on and off of a wheelbarrow bin, with minimal expenditure of time and energy.

To further insure that the apparatus is firmly held in position, a tensioning device, preferably in the form of a spring, is coupled to the apparatus. The tensioning device functions to draw the sides of the flexible barrier slightly inward, toward the interior of the wheelbarrow bin, thus preventing an expansive load of material from pushing the entire apparatus from the top of the wheelbarrow bin.

In the preferred embodiment, the apparatus is provided with a means for allowing the apparatus to be collapsed upon itself. In this way, the apparatus can be readily broken down and either stored in place or removed and stored in a confined location.

An object of the invention is to provide a wall extension apparatus for a wheelbarrow bin which is easily collapsible.

Another object of the invention is to provide a wall extension apparatus for a wheelbarrow bin which increases the effective volume of a wheelbarrow bin.

Still another object of the invention is to provide a wall extension apparatus for a wheelbarrow bin which is flexible.

Further objects and advantages of the invention will be brought out in the following portions of the specification, wherein the detailed description is for the purpose of fully disclosing the preferred embodiments of the invention without placing limitations thereon.

BRIEF DESCRIPTION OF THE DRAWINGS

The invention will be more fully understood by reference to the following drawings which are for illustrative purposes only:

FIG. 3 is a cross-section view of the lower rail portion of the apparatus shown in FIG. 1 taken through line 3—3.

FIG. 4 is an assembled view of the apparatus shown in FIG. 1 depicted in a collapsed position but without the flexible barrier being shown.

FIG. 5 is a cross-section view of the lower rail portion of the apparatus shown in FIG. 4 taken through line 5—5.

FIG. 6 is a perspective view of an alternative embodiment of the present invention coupled to a wheelbarrow bin shown in phantom.

DESCRIPTION OF THE PREFERRED EMBODIMENTS

Referring more specifically to the drawings, for illustrative purposes, the present invention is embodied in the apparatus 10 generally shown in FIG. 1 through FIG. 6. It will be appreciated that the invention may vary as to configuration and as to details of the parts without departing from the basic concepts as disclosed herein.

Figure 1:
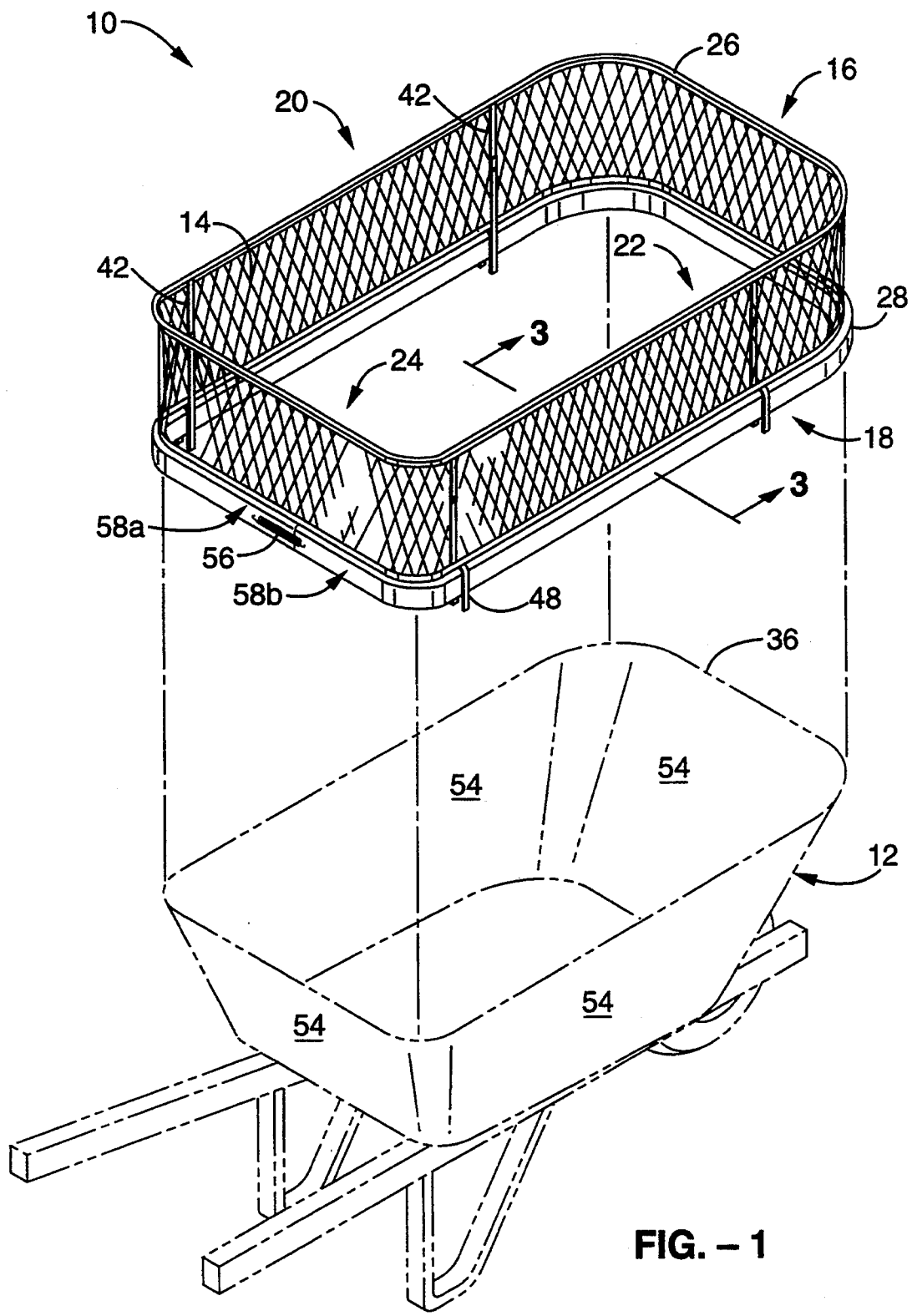
FIG. 1 is an exploded view of the preferred embodiment of the present invention coupled to a wheelbarrow bin shown in phantom.

Referring to FIG. 1, a wheelbarrow extension apparatus 10 in accordance with the present invention is shown assembled on a wheelbarrow bin 12. The apparatus includes a barrier 14 having a top 16, a bottom 18, a first side 20, a second side 22 and a back wall 24. Barrier 14 is preferably constructed from a flexible material such as plastic, with or without openings, or net or mesh materials having an open or a fine weave.

Figure 2:
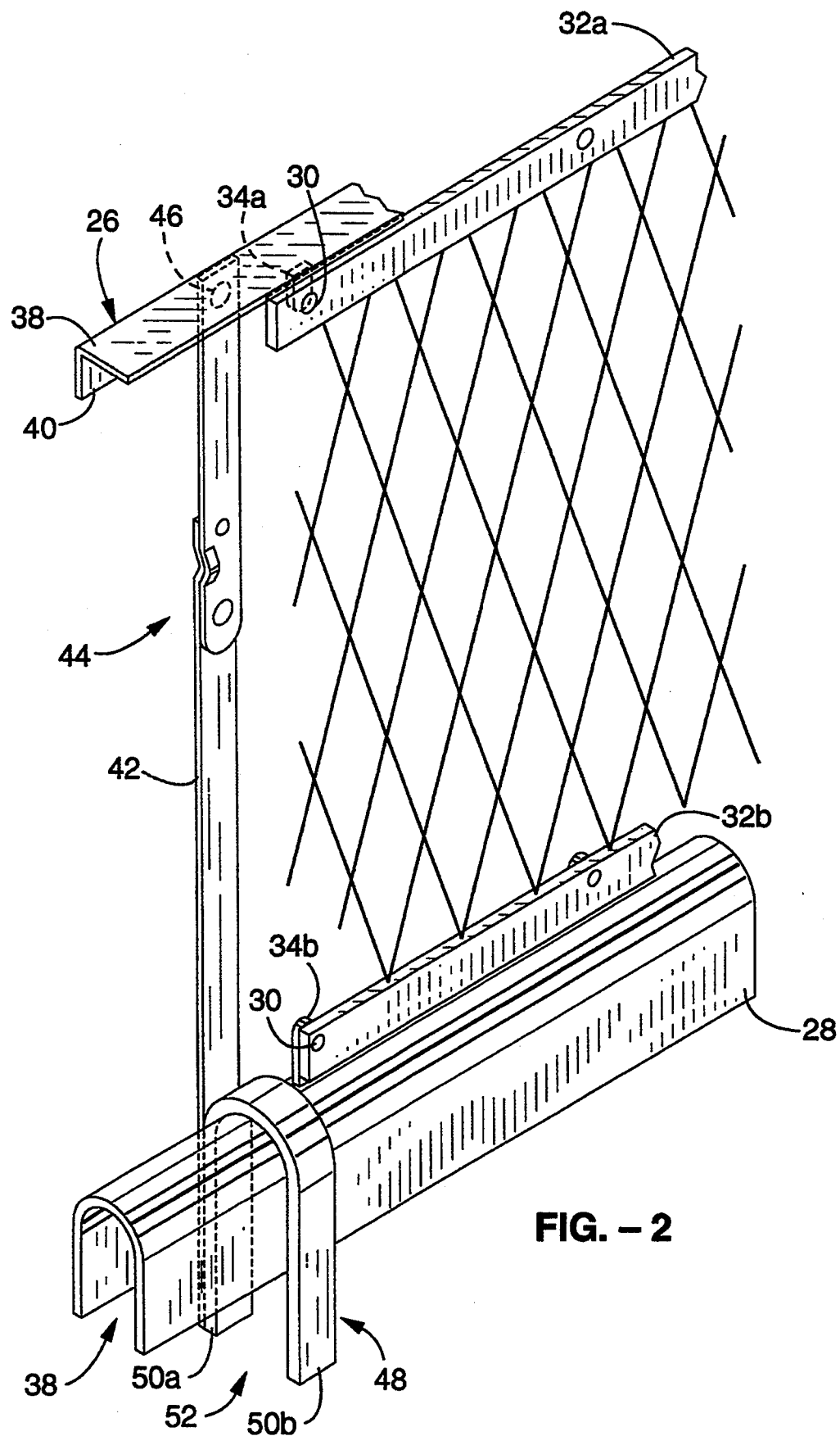
FIG. 2 is a fragmentary view of the lower rail portion of the apparatus shown in FIG. 1 with a collapsing means attached.

Referring also to FIG. 2 and FIG. 3, an elongated upper rail 26 and an elongated lower rail 28 are coupled to top 16 and bottom 18 of barrier 14, respectively, and are aligned in a substantially parallel relation to each other. Coupling is made by means of fasteners 30, which can be rivets or any conventional fastening device. Preferably, fasteners 30 are coupled to reinforcing bands 32a, 32b which surround the outer edges of barrier 14. Bands 32a, 32b, which can be fashioned from plastic, nylon, cloth or the like, serve to provide a coupling surface for coupling the edges of barrier 14 to tabs 34a, 34b which extend from rails 26, 28, respectively. In the preferred embodiment, fasteners 30 are grommets located in band 32, and tabs 34 include a protruding portion which extends through fasteners 30 and couples fasteners 30 thereto.

As can be seen, rails 26, 28 provide structural integrity to the apparatus. Upper rail 26 and lower rail 28 may be constructed from a variety of materials which provide the requisite amount of flexibility required by the invention. Metals and plastics are contemplated as being especially suitable for accomplishing the ends of this invention. Additionally, in the preferred embodiment, upper rail 26 and lower rail 28 are shaped in a lengthwise relation to substantially follow the rim 36 of wheelbarrow bin 12 so as to avoid having portions of the apparatus 10 overlapping wheelbarrow bin 12 and possibly snagging upon bushes, or other obstacles. For example, if rim 36 has an arcuate shape throughout its length, rails 26, 28 would likewise be arcuate throughout their lengths to retain minimal overlap of rails 26, 28 beyond rim 36. Lower rail 28 includes an open channel 38 which is sized and shaped to receive rim 36 with relatively tight frictional engagement. In this way, lower rail 28 is coupled to rim 36 along its entire perimeter to provide support as well as a means for coupling the apparatus to the wheelbarrow. Upper rail 26 is preferably substantially "L-shaped", having a first leg 38 which is substantially perpendicular to a second leg 40. Tabs 34a extend downward from first leg 38 as shown.

Referring also to FIG. 3 and FIG. 4, it can be seen that vertical stability is provided by a plurality of support members 42. Support members 42 are preferably coupled between upper rail 26 and lower rail 28 in a substantially perpendicular orientation in relation thereto, and are spaced along rails 26, 28 at various positions as shown, for rigidity.

Although the apparatus 10 can function adequately as a rigid structure, it has been found to be preferable that the apparatus 10 be collapsible for purposes of easy storage. Therefore, a collapsing means 44 is incorporated into each support member 42. Preferably, collapsing means 44 takes the form of a collapsible hinge included as part of support member 42 which can be locked in its fully extended position. Support member 42 may also preferably incorporate pivots 46 at the point of coupling of support member 42 to second leg 40 on upper rail 26. Pivots 46 allow support members 42 to rotate around the point of coupling to upper rail 26, thus allowing upper rail 26 and lower rail 28 to generally lay flat against each other when in a fully collapsed position as shown in FIG. 4 and FIG. 5. In this manner, the apparatus 10 can be stored in a collapsed position while still attached to the wheelbarrow, or stored in a confined space when removed. Additionally, rails 26, 28 can be made to fold at one or more points along their lengths for purposes of incorporating additional collapsibility into the apparatus 10.

Referring more specifically to FIG. 2 and FIG. 3, while lower rail 28 individually functions to securely couple the apparatus to rim 36, additional support can be provided by including a plurality of reinforcing means 48 which are coupled to support members 42 and lower rail 28. In the preferred embodiment, reinforcing means 48 comprises an arcuate or U-shaped bracket having a pair of legs 50a, 50b extending downward beyond lower rail 28 in a parallel relation to each other. Reinforcing means 48 can be formed integrally with support members 42 or lower rail 28, or may be a separate component coupled thereto by any conventional fastening technique such as welding or bolts. A gap 52 is formed between legs 50a, 50b for receiving rim 36 and wall 54 of wheelbarrow bin 12. In this way, legs 50a, 50b will abut wall 54 and resist lateral movement of the apparatus, thereby providing additional support and coupling to wheelbarrow bin 12. Alternatively, instead of using reinforcing means 48, lower rail 28 could be made to extending over rim 36 sufficiently to provide additional lateral support.

Referring again to FIG. 1, tension is applied to barrier 14 by the use of a tensioning means 56. While lower rail 28 can be one continuous piece, it has been found that the addition of tensioning means 56 to lower rail 28 provides added integrity to the apparatus. Tensioning means 56 is preferably a spring incorporated into the back portion of lower rail 28. In the preferred embodiment, the back portion of lower rail 28 is broken at a point along its length such that a pair of opposing, slidably overlapping, ends 58a, 58b are created. Tensioning means 56 is then coupled between ends 58a, 58b to create inward tension, thereby drawing the opposing ends 58a, 58b toward each other. By drawing the opposing ends 58a, 58b of lower rail 28 together, sides 20, 22 of barrier 14 are simultaneously drawn toward the inside of wheelbarrow bin 12, thus further preventing apparatus 10 from falling off of wheelbarrow bin 12 due to movement, or due to a bulky load pushing outward against barrier 14.

In the alternate embodiment shown in FIG. 6, tensioning means 56 may be incorporated into back wall 24 of barrier 14. In this embodiment, back wall 24 comprises a portion of barrier 14 supported only by reinforcing bands 32a, 32b, or further support can be provided by an upper nylon strap 60 and a lower nylon strap 62. As can be seen, in this embodiment back wall 24 is not supported by rails 26, 28 since they terminate in the transitional area, or corners, between side walls 20, 22 and back wall 24. A pair of tensioning means 56 are then positioned between the ends of nylon straps 58, 60 and a corner support member 42. Tensioning means 56 are anchored directly to support member 42 or, alternatively, are anchored indirectly to support member 42 through use of a turnbuckle (not shown), if desired.

Accordingly, it will be seen that this invention provides a wheelbarrow bin wall extension apparatus 10 which includes a barrier 14 coupled to an upper rail 26 and a lower rail 28 which can be coupled to the rim 36 of wheelbarrow bin 12. The extended walls provided by the present invention effectively increases the usable volume of a wheelbarrow bin 12. Additionally, the apparatus includes a collapsing means 44 which allows for convenient storage when not in use.

Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. An apparatus for increasing the storage capacity of a wheelbarrow bin, comprising:
    (a) a flexible barrier;
    (b) an elongated lower rail, said lower rail having a lengthwise shape substantially conforming to the lengthwise shape of a wheelbarrow rim;
    (c) an elongated upper rail, said upper rail having a lengthwise shape substantially conforming to the lengthwise shape of said wheelbarrow rim;
    (d) said upper and lower rails aligned in a substantially parallel orientation in relation to each other;
    (e) said flexible barrier supported between said upper and lower rails;
    (f) a plurality of collapsible support members, said support members coupled to and positioned between said upper and lower rails in a substantially perpendicular orientation in relation to said rails; and
    (g) a plurality of reinforcing means for resisting lateral movement of said apparatus in relation to said wheelbarrow, each said reinforcing means coupled to said lower rail and to a corresponding said one of said support members, each said reinforcing means extending downward from said lower rail, each said reinforcing means including an open portion oriented downward from said lower rail.

2. An apparatus as recited in claim 1, further comprising tensioning means for maintaining tension on said flexible barrier.

3. An apparatus as recited in claim 2, wherein said flexible barrier comprises a netted material.

4. An apparatus as recited in claim 2, wherein said lower rail includes first and second ends, and wherein said tensioning means is coupled between said first and second ends of said lower rail.

5. An apparatus as recited in claim 2, wherein said tensioning means is coupled between said flexible barrier and a said one of said support members.

6. A wheelbarrow wall extension apparatus, comprising:
    (a) a flexible barrier;
    (b) an elongated lower rail, said lower rail having an arcuate lengthwise shape substantially conforming to the arcuate lengthwise shape of a wheelbarrow rim;
    (c) an elongated upper rail, said upper rail having an arcuate lengthwise shape substantially conforming to said arcuate lengthwise shape of said wheelbarrow rim;
    (d) said upper and lower rails aligned in a substantially parallel orientation in relation to each other;
    (e) said flexible barrier supported between said upper and lower rails;
    (f) a plurality of collapsible support members, said support members coupled to and positioned between said upper and lower rails in a substantially perpendicular orientation in relation to said rails;
    (g) tensioning means for maintaining tension on said flexible barrier; and
    (h) a plurality of reinforcing means for resisting lateral movement of said apparatus in relation to said wheelbarrow, each said reinforcing means coupled to said lower rail and to a corresponding said one of said support members, each said reinforcing means extending downward from said lower rail, each said reinforcing means including an open portion oriented downward from said lower rail.

7. An apparatus as recited in claim 6, wherein said flexible barrier comprises a netted material.

8. An apparatus as recited in claim 6, wherein said lower rail includes first and second ends, and wherein said tensioning means is coupled between said first and second ends of said lower rail.

9. An apparatus as recited in claim 6, wherein said tensioning means is coupled between a back wall of said apparatus and a said one of said support members.

10. An apparatus for increasing the volume of a wheelbarrow bin, comprising:
    (a) a flexible net barrier;
    (b) an elongated lower rail, said lower rail having an arcuate lengthwise shape substantially conforming to the arcuate lengthwise shape of a wheelbarrow rim;
    (c) an elongated upper rail, said upper rail having an arcuate lengthwise shape substantially conforming to said arcuate lengthwise shape of said wheelbarrow rim;
    (d) said upper and lower rails aligned in a substantially parallel orientation in relation to each other;

(e) said flexible net barrier supported between said upper and lower rails:
(f) a plurality of collapsible support members, said support members coupled to and positioned between said upper and lower rails in a substantially perpendicular orientation in relation to said rails;
(g) a plurality of reinforcing means for resisting lateral movement of said apparatus in relation to said wheelbarrow, each said reinforcing means coupled to said lower rail and to a corresponding said one of said support members, each said reinforcing means extending downward from said lower rail, each said reinforcing means including an open portion oriented downward from said lower rail; and
(h) tensioning means for maintaining tension on said flexible barrier.

11. An apparatus as recited in claim 10, wherein said lower rail includes first and second ends, and wherein said tensioning means is coupled between said first and second ends of said lower rail.

12. An apparatus as recited in claim 10, wherein said tensioning means is coupled between a back wall of said apparatus and a said one of said support members.

13. An apparatus for increasing the storage capacity of a wheelbarrow bin, comprising:
(a) a flexible barrier;
(b) an elongated lower rail, said lower rail having a lengthwise shape substantially conforming to the lengthwise shape of a wheelbarrow rim;
(c) an elongated upper rail, said upper rail having a lengthwise shape substantially conforming to the lengthwise shape of said wheelbarrow rim;
(d) said upper and lower rails aligned in a substantially parallel orientation in relation to each other;
(e) said flexible barrier supported between said upper and lower rails:
(f) a plurality of collapsible support members, said support members coupled to and positioned between said upper and lower rails in a substantially perpendicular orientation in relation to said rails; and
(g) tensioning means for maintaining tension on said flexible barrier, said tensioning means coupled between said flexible barrier and a said one of said support members.

14. A wheelbarrow wall extension apparatus, comprising:
(a) a flexible barrier;
(b) an elongated lower rail, said lower rail having an arcuate lengthwise shape substantially conforming to the arcuate lengthwise shape of a wheelbarrow rim;
(c) an elongated upper rail, said upper rail having an arcuate lengthwise shape substantially conforming to said arcuate lengthwise shape of said wheelbarrow rim;
(d) said upper and lower rails aligned in a substantially parallel orientation in relation to each other;
(e) said flexible barrier supported between said upper and lower rails;
(f) a plurality of collapsible support members, said support members coupled to and positioned between said upper and lower rails in a substantially perpendicular orientation in relation to said rails;
(g) tensioning means for maintaining tension on said flexible barrier, said tensioning means coupled between a back wall of said apparatus and a said one of said support members; and
(h) reinforcing means for providing reinforcement to said lower rail, said reinforcing means further for communicating with said wheelbarrow bin.

15. An apparatus for increasing the volume of a wheelbarrow bin, comprising:
(a) a flexible net barrier;
(b) an elongated lower rail, said lower rail having an arcuate lengthwise shape substantially conforming to the arcuate lengthwise shape of a wheelbarrow rim;
(c) an elongated upper rail, said upper rail having an arcuate lengthwise shape substantially conforming to said arcuate lengthwise shape of said wheelbarrow rim;
(d) said upper and lower rails aligned in a substantially parallel orientation in relation to each other;
(e) said flexible net barrier supported between said upper and lower rails;
(f) a plurality of collapsible support members, said support members coupled to and positioned between said upper and lower rails in a substantially perpendicular orientation in relation to said rails;
(g) reinforcing means for providing reinforcement to said lower rail, said reinforcing means further for communicating with said wheelbarrow bin; and
(h) tensioning means for maintaining tension on said flexible barrier, said tensioning means coupled between a back wall of said apparatus and a said one of said support members.

* * * * *